L. J. SCHWARTZ.
CONCAVE FOR THRESHING MACHINES.
APPLICATION FILED SEPT. 4, 1915.
1,226,601.
Patented May 15, 1917.
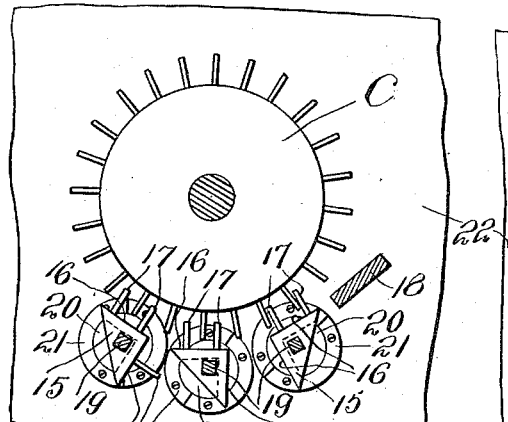
Fig. 1.
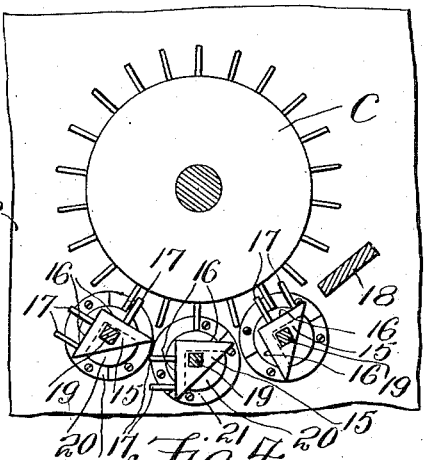
Fig. 2.
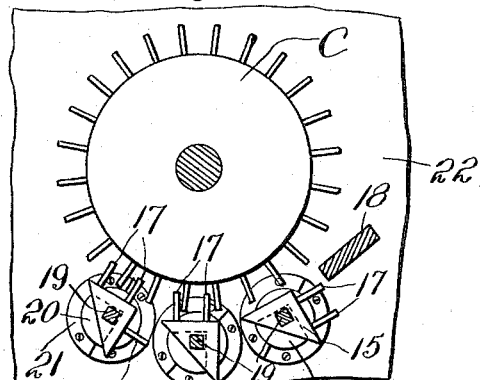
Fig. 3.
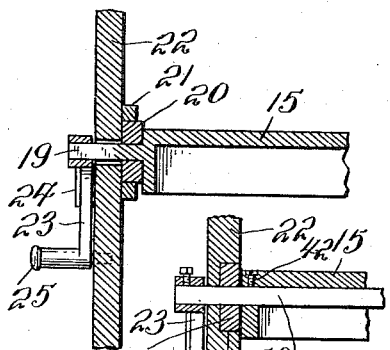
Fig. 5.
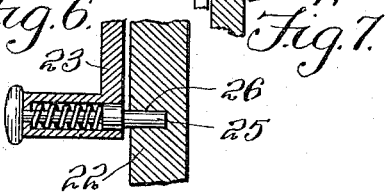
Fig. 6. Fig. 7.
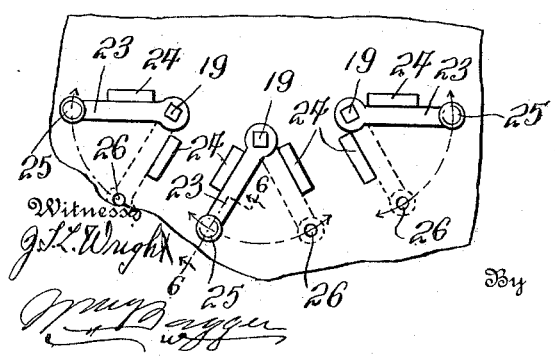
Witnesses
J. L. Wright
Inventor
L. J. Schwartz
By Victor J. Evans
Attorney

UNITED STATES PATENT OFFICE.

LEO J. SCHWARTZ, OF WINNETOON, NEBRASKA.

CONCAVE FOR THRESHING-MACHINES.

1,226,601.  Specification of Letters Patent.  Patented May 15, 1917.

Application filed September 4, 1915. Serial No. 49,087.

*To all whom it may concern:*

Be it known that I, LEO J. SCHWARTZ, a citizen of the United States, residing at Winnetoon, in the county of Knox and State of Nebraska, have invented new and useful Improvements in Concaves for Threshing-Machines, of which the following is a specification.

This invention relates to concaves for threshing machines, and it has for its object to produce a simple and improved device whereby the number of rows of teeth in the concave may be varied so as to give the best results according to the kind and condition of grain that is to be threshed.

A further object of the invention is to produce a concave comprising a plurality of pivotally supported bars each having a plurality of faces some or all of which are provided with one or more rows of teeth which, by turning said bars about their pivotal axes, may be exposed for coöperation with the teeth of the cylinder.

A further object of the invention is to produce a concave comprising a plurality of bars of triangular cross section, some of which are provided with one or more rows of teeth, said bars being capable of being turned and retained in position with the desired teeth exposed for operation.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing,—

Figures 1, 2 and 3 are cross sectional views of a threshing machine cylinder and concave showing various adjustments of the concave bars.

Fig. 4 is a sectional detail view taken through a portion of one of the rocking tooth-carrying bars and through one side wall of the casing.

Fig. 5 is a detail side elevation showing a portion of the casing of a machine to which the invention has been applied to illustrate the means for adjusting and securing the concave bars.

Fig. 6 is a sectional detail view taken on the line 6—6 in Fig. 5 of one of the adjusting cranks.

Fig. 7 is a sectional detail view illustrating a modification.

Corresponding parts in the several figures are denoted by like characters of reference.

The threshing cylinder C is of ordinary well known construction. The concave is composed of a plurality of bars 15 of triangular cross section, each bar preferably having two faces 16 disposed at right angles to each other. Some of the faces 16 of the several bars are provided with teeth 17 extending at right angles thereto. Some of the faces are left blank or vacant. In the drawing, three concave bars have been shown. One face 16 of each of the three bars is provided with two rows of teeth 17; the second face 16 of the rearward bar is provided with a single row of teeth, as shown. This is a convenient and economical arrangement, but it may be varied within the scope of the invention. A feed plate 18 is supported adjacent to the foremost concave bar.

Each of the bars 15 is provided at the ends thereof with trunnions 19 of square cross section, the faces of the trunnions 19 being preferably in parallel relation to the side faces 16 of the bars. These trunnions are provided with circular washers 20 for which bearings 21 are provided on each side 22 of the machine frame or casing. The concave bars are thus supported for rocking movement. For the purpose of rocking the concave bars cranks 23 are mounted on the trunnions, and the side of the machine casing is preferably provided with lugs or abutments 24 lying in the path of the respective cranks to limit the movement thereof and to resist the strain to which the device is subjected. Each crank may also be provided with a spring actuated stop member 25 to engage suitable recesses or indentations 26 in the side of the casing for the purpose of preventing accidental displacement thereof. Any well known means may, however, be used for locking and securing the concave at various adjustments.

By reference to Fig. 1, it will be seen that the bars 15 may be adjusted so that each bar will present two rows of teeth for coöperation with the cylinder. This arrangement is suitable for threshing wheat in good condition. Under the arrangement shown in Fig. 2 the foremost bar 15 presents two rows of teeth and the rearmost a single row of teeth for coöperation with the cylinder, the intermediate bar 15 being adjusted to present a blank face to the cylinder. This arrangement will be found suitable for threshing wet tangled grain. With the arrangement shown in Fig. 3, the foremost bar presents a blank face to the cylinder, while the rearward and intermediate bars each present two rows of teeth, this arrangement being suitable for threshing grain, the condition of which renders it desirable that the cylinder should exercise a considerable degree of suction before beating the grain against the concave teeth. Other conditions may be met by different adjustment of the concave bars which will readily suggest themselves to the skilled thresherman.

In Fig. 7 there is illustrated a modification of the invention whereby the bearing members 21 are dispensed with. When this construction is adopted the washers or bearing disks, here designated by 20', are fitted in recesses formed in the walls of the separator casing, one such recess appearing in Fig. 7 where it is designated by 40. By this arrangement the bars 15 which constitute the concave may be made to abut upon the inner faces of the side walls of the machine casing, leaving no open spaces through which material may pass without being subjected to the beating action of the threshing mechanism. In this modification the bar 15, instead of being provided with integral trunnions, is mounted on a shaft 41 of square cross section extending therethrough, the bar being secured on said shaft by means of a set screw 42. It will be seen that by removing said set screw and the crank 23, the shaft may be withdrawn, thus permitting the bar 15 to be readily detached. By this construction the making of repairs will be greatly facilitated.

Having thus described the invention, what is claimed as new, is:—

The combination with a toothed threshing cylinder, of a concave comprising a plurality of rocking bars spaced apart for the passage of grain therebetween, each bar having a plurality of faces which may be alternately exposed toward the cylinder, some faces of the several bars being provided with varying numbers of teeth arranged in rows on said faces, and other faces being left blank whereby, by rocking adjustment of the bars, the number of teeth exposed for coöperation with the teeth of the cylinder and the relative arrangement of said teeth may be greatly varied.

In testimony whereof I affix my signature in presence of two witnesses.

LEO J. SCHWARTZ.

Witnesses:
GEO. W. SAUNDERS,
H. W. CRANDALL.

Copies of this patent may be obtained for five cents each, by addressing the "Commissioner of Patents, Washington, D. C."